Figure 1:
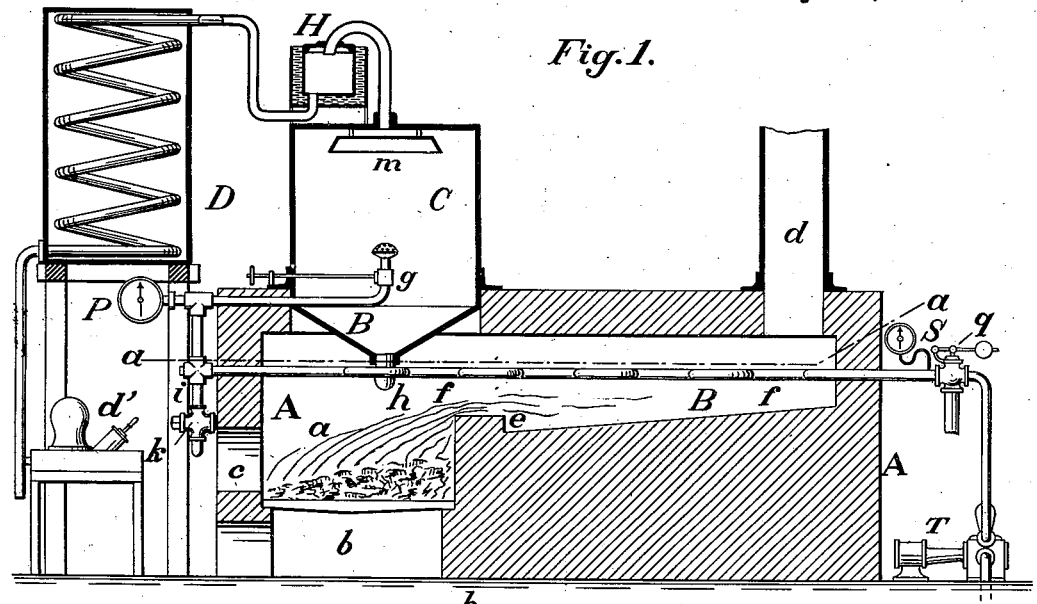

(No Model.)

G. L. BENTON.
APPARATUS FOR REFINING CRUDE PETROLEUM.

No. 342,565. Patented May 25, 1886.

WITNESSES:
Theodore Bergner
Louis Kurbler

INVENTOR:
George L. Benton.
By J. Walter Douglass
Atty.

UNITED STATES PATENT OFFICE.

GEORGE L. BENTON, OF TITUSVILLE, PENNSYLVANIA.

APPARATUS FOR REFINING CRUDE PETROLEUM.

SPECIFICATION forming part of Letters Patent No. 342,565, dated May 25, 1886.

Application filed May 13, 1885. Serial No. 165,310. (No model.)

*To all whom it may concern:*

Be it known that I, GEORGE L. BENTON, of Titusville, in the county of Crawford and State of Pennsylvania, have invented certain new and useful Improvements in Apparatus for Refining Crude Petroleum, of which improvements the following is a specification, reference being had to the accompanying drawings, which form part hereof.

In a separate application for Letters Patent of the United States, Serial No. 156,993, under date of February 25, 1885, I have described and claimed my improved process of refining crude petroleum, for the conduct of which I employ the apparatus to be hereinafter more particularly described. This process of refining crude petroleum is based upon the fact that the hydrocarbons comprising the crude petroleum, while only mechanically mixed, are susceptible of being treated so as to become homogeneously or chemically combined, and upon this principle I based the experiments involved in the development of my improved apparatus for the conduct of the said process, the object of which consists, essentially, in subjecting the crude petroleum to high heat and pressure in a chamber or pipe or vessel and so regulating the heat applied as to raise the temperature of the crude liquid to about 700° Fahrenheit, or higher, while maintaining a pressure of about five hundred pounds per square inch, (more or less,) until the heat shall have been continued long enough and raised high enough to bring the entire body of the oil confined in the pipe or vessel to a uniform temperature, when it is next discharged in a spray into a vapor-chamber, in which the previous high temperature is still maintained, but the pressure removed. The different hydrocarbons will vaporize simultaneously, forming a homogeneous vapor, (instead of first vaporizing the benzine and then the next heaviest hydrocarbons, as heretofore mentioned,) and these liberated vapors will be kept homogeneous by the intimate chemical affinity of their constituents, while any unvaporized portions of the mass accumulating precipitate in this intermediate vessel, from the bottom of which they may be drawn off through a suitable pipe or cock. The final step consists in conducting the homogeneous vapors from this vapor-chamber to an ordinary condenser, which may consist of a coil of pipes immersed in water in a tank or other containing-vessel, and this condensation reduces the vapor to a homogeneous fluid possessing all the more desirable properties of high-test illuminating-oil, and containing in its homogeneous bulk substantially all of the benzine, which has heretofore been ordinarily expelled from it, as previously mentioned.

In the accompanying drawings I have represented my improved apparatus such as I have used with practical success in the conduct of my improved process.

Figure 2:
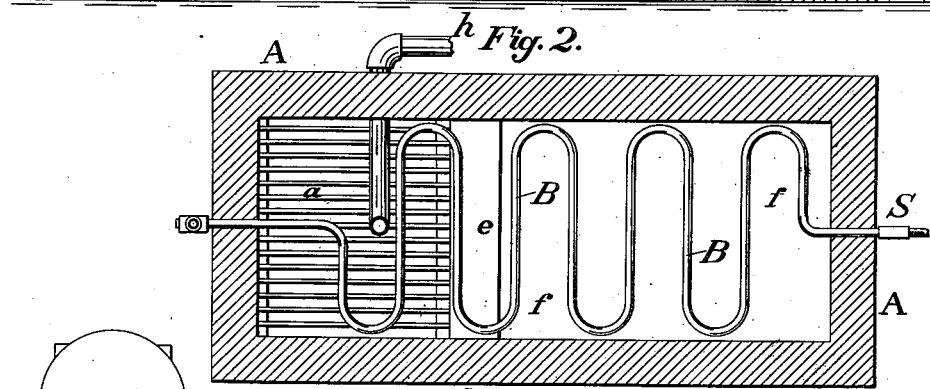
Figure 3:
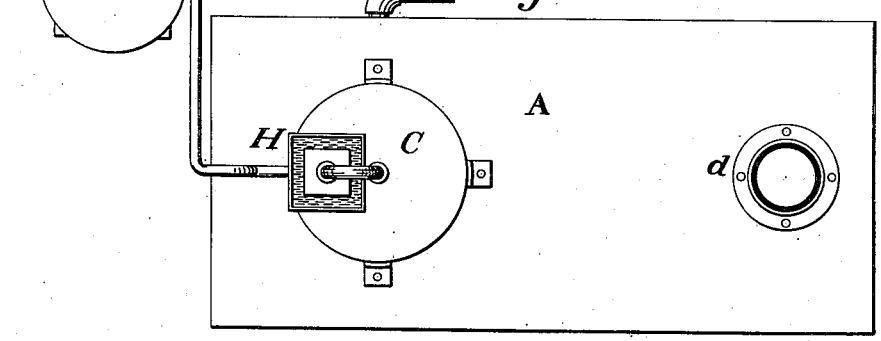

Figure 1 is a vertical longitudinal section through the apparatus. Fig. 2 is a horizontal longitudinal section on the line $a\,a$ of Fig. 1, and Fig. 3 is a plan or top view.

This apparatus consists of a furnace, A, constructed of brick-work, and provided with a grate, $a$, an ash-pit, $b$, a door, $c$, a chimney, $d$, a fire-bridge, $e$, and a chamber-space, $f$, extending from end to end and from side to side of the interior of the furnace, as seen in Figs. 1 and 2. In the chamber-space $f$ is arranged the coil-pipe B, Fig. 2, connected at the rear end through the furnace-wall with the oil-supply, and provided at this end with a pressure-gage, S, and an overflow pressure-valve, $q$, of any suitable construction, to prevent undue increase of pressure in the pipe B. This pipe extends at the front end through the furnace-wall, and is provided with a pyrometer, P. The pipe B is continued up into the vapor-chamber C, as shown, and this end of the pipe B is provided with a rose or perforated cap, through which the highly-heated crude oil can be sprayed into the chamber C. I prefer to connect with the pipe B, outside of the furnace, a waste-pipe, $i$, with a stop-cock, $k$, for a purpose to be presently described.

The vapor-chamber C is an inclosed metallic vessel of suitable strength, and made air-tight. It is fitted into the top of the furnace, as shown, and has a dished bottom, which is exposed to the heat of the furnace or chamber $f$, and it has an outlet-pipe, $h$, leading off through the furnace to the outside. Underneath the top of this vapor-chamber C, and above the spray-pipe B, is a deflecting-hood, $m$, extending out toward the sides of the chamber, but having an annular space between the edge of the hood and the side of the vapor-chamber. In the top of the vapor-chamber is a pipe which leads off, preferably, to the manifold H, which is a condensing-box of the ordinary construction, and thence by pipes to the condenser D; or the vapor may pass directly from the chamber C to the condenser D, and at the lower end of this condenser an air-pump may be attached, as shown in the drawings, and for a purpose to be hereinafter specified.

A stop-cock, g, is so arranged as to be operated from the outside of the vapor chamber, and to be opened or shut as it is desired to regulate the discharge of the highly-heated oil from the pipe B into the chamber C, or to confine it to the pipe B.

In this apparatus the operation is conducted as follows: The stop-cock g being shut, and the waste-pipe i, connected with the pipe B, being opened, a fire is started on the grate a, and the crude oil is let in from the supply to the coil-pipe B, and allowed to flow out through the waste-pipe i, (from which it is led back to the supply,) while the pipe B and the chamber f attain the proper temperature, which will be ascertained by the observation of the workman in charge. When he finds that the furnace has attained the proper temperature, he shuts the waste-cock k, and, the stop cock g being already shut, thus confines the oil in the pipe B under the pressure of the supply, or of a pump, T, which feeds the oil to the pipes. The oil with which the pipe B is thus filled is kept in the pipe under this pressure until the pyrometer indicates that it has attained a temperature sufficiently high to have had the latent vaporizing effect upon the oil, (in practice I have found this temperature to range from 700° to 1,000° Fahrenheit,) when the stop-cock g is opened, and the released vaporized oil rushes out through the rose in the end of the pipe B, and strikes on the under side of the hood m, from which it is deflected downward, and then rises through the annular space between the hood and the wall of the chamber C, and passes into the pipe which leads directly to the condenser D or to the manifold H, and thence by pipes to the condenser D, and through this condenser into a receiving-tank of any ordinary construction. It will be understood that the chamber C will have become heated before the admission of the vaporized oil into it, and that its temperature is maintained by the furnace to correspond substantially with that of the spray escaping into it from the coiled pipe B, through which the passage of the crude oil is kept up continuously under the regulated pressure at such velocity as to provide time for its required increase of temperature while passing through the furnace. To promote the passage of the vapor from the chamber C to the condenser D, I connect an ordinary air-pump with the lower end of the coil D at d', and thus facilitate the operation. By this process I have found that the oil is raised to and maintained at a sufficiently high temperature to vaporize it as soon as it is released from the pressure under which it is confined in the pipe B, while until so released it is prevented by the pressure from vaporizing at all, and consequently when it is permitted to escape into the heated chamber C it bursts into vapor, and this vapor is entirely homogeneous, so that after being deflected in the chamber C and then rising again to pass off into the condenser D it passes off in one homogeneous volume, while depositing in the bottom of the chamber C such heavy or non-volatilized impurities as may have been in the crude petroleum. These accumulating impurities are drawn off through the pipe h in the bottom of the chamber C.

Having thus described the nature and objects of my invention, what I claim as new, and desire to secure by Letters Patent, is—

1. The combination, with the furnace A, of the heating-chamber f, the latent vaporizing-pipe B, connected with an oil-supply and situated within the furnace, the vapor-chamber C, located above the furnace and directly heated thereby, and the condenser D, substantially as and for the purposes described.

2. The combination, with the furnace, of the latent vaporizing-pipe, the stop-cock g, and the feed-supply pump and overflow pressure-valve, substantially as and for the purposes described.

GEO. L. BENTON.

Witnesses:
THEODORE BERGNER,
WILLIAM C. MAYNE.